United States Patent de Grave et al.

[11] Patent Number: 5,262,446
[45] Date of Patent: Nov. 16, 1993

[54] POLYOLEFIN FOAMS HAVING A HOMOGENEOUS CELL STRUCTURE

[75] Inventors: Isidoor de Grave, Wachenheim; Wolfram Koegel, Mannheim; Klaus Hahn, Kirchheim, all of Fed. Rep. of Germany

[73] Assignee: BASF Aktiengesellschaft, Ludwigshafen, Fed. Rep. of Germany

[21] Appl. No.: 36,855

[22] Filed: Mar. 25, 1993

Related U.S. Application Data

[62] Division of Ser. No. 2,039, Jan. 8, 1993.

[30] Foreign Application Priority Data

Jan. 9, 1992 [DE] Fed. Rep. of Germany ....... 4200559

[51] Int. Cl.[5] ............................ C08J 9/20; C08J 9/224
[52] U.S. Cl. .................................. 521/97; 521/56; 521/60; 521/97; 521/143
[58] Field of Search .................. 521/56, 60, 97, 143, 521/57

[56] References Cited

U.S. PATENT DOCUMENTS

| | | | |
|---|---|---|---|
| 4,080,344 | 3/1978 | Ikeda et al. | 521/60 |
| 4,676,939 | 6/1987 | Kuwabara | 521/56 |
| 4,769,394 | 9/1988 | Hahn et al. | 521/146 |

Primary Examiner—Morton Foelak
Attorney, Agent, or Firm—Keil & Weinkauf

[57] ABSTRACT

Polyolefin foams having a density of from 0.01 to 0.1 $g/cm^3$ and having 2 to 1000 $cells/mm^2$ and containing a resin acid, a lower alkyl ester of a resin acid or (hydro) abietyl phthalate as organic foaming aid have a homogeneous cell structure.

5 Claims, No Drawings

POLYOLEFIN FOAMS HAVING A HOMOGENEOUS CELL STRUCTURE

This is a division of application Ser. No. 08/002,039, filed Jan. 8, 1993.

The present invention relates to polyolefin foams having a homogeneous cell structure and containing a specific organic foaming aid, and to a process for the preparation thereof.

Foams based on polyolefins and olefin copolymers are of considerable industrial interest due to their heat resistance and good shock-absorbent properties. They are prepared in a known manner by impregnating the polymer with a volatile blowing agent at elevated temperature under pressure and decompressing the mixture. Either the extrusion method or, advantageously, the suspension impregnation method is used. The latter proceeds from polymer particles which are impregnated in aqueous suspension with the blowing agent and subsequently expanded to give foam particles. Moldings of any desired shape can be produced by welding the foam particles.

In addition, the foam particles can also be subjected to pressure treatment, as described in DE-A 39 22 207.

In practice, however, it has been found that the cell structure of the foam particles obtained is non-uniform. This has the consequence that the surface of the moldings has an uneven, speckled structure, and that uneven foam structures are obtained when foam sheets or blocks are cut.

These uneven (cut) surfaces are particularly disturbing if the foams are pigmented for optical reasons, in particular if they are pigmented in a dark color, for example black.

EP-A 168 954 discloses a process for the production of foamed polypropylene resin particles in which an inorganic or organic foaming aid is employed. The foaming aid is an organic or inorganic solid having a particle size of from 0.1 to 150 $\mu$m and a melting point which is higher than the temperature at which the foamable particles are foamed. Numerous inorganic foaming aids are indicated. The only examples mentioned of suitable organic foaming aids are dibenzylidenesorbitol and aluminum p-t-butyl benzoate, particular preference being given to the use of dibenzylidenesorbitol.

U.S. Pat. No. 3,526,625 discloses to prepare expandable styrene polymers in the presence of from 0.5 to 2.5% by weight of resin acids, such as (hydro) abietic acid, or lower alkyl esters thereof, or (hydro) abietyl phthalate. The products have an extremely low molding temperature on conversion to foams, which thus have the disadvantage of inadequate heat resistance. In addition, their foam structure is unsatisfactory.

U.S. Pat. No. 4,769,394 discloses styrene polymer foams having a particularly uniform and fine-celled foam structure. This was achieved by adding a small amount of a mixture of resin acids or lower alkyl esters thereof or (hydro) abietyl phthalate and a polyoxyethylene monoester or monoether. U.S. Pat. No. 4,769,394 also states that, in particular, the disadvantages observed when resin acids or lower alkyl esters thereof or polyoxyethylene monoesters or monoethers are used do not occur if a combination of the two additives is used.

It is an object of the present invention to provide polyolefin foams having a homogeneous cell structure (i.e. a homogeneous foam surface and a narrow cell diameter distribution).

We have found that, surprisingly, this object is achieved by polyolefin foams which contain, as an organic foaming aid, a resin acid, a lower alkyl ester of a resin acid or (hydro) abietyl phthalate.

The present invention accordingly provides polyolefin foams having a density of from 0.01 to 0.1 g/cm$^3$ and having from 2 to 1000 cells/mm$^2$ and generally containing from 0.003 to 0.3% by weight, based on the olefin polymer, of a resin acid, a lower alkyl ester of a resin acid or (hydro) abietyl phthalate.

The present invention also provides a process for the preparation of polyolefin foams in which the polyolefin, in the form of particles having a mean diameter of from 0.5 to 5 mm, is first coated in aqueous suspension with the organic foaming aid, then impregnated with from 0.1 to 0.4 kg, per kg of the polyolefin, of a blowing agent and from up to 20° C. below the crystallite melting point to up to 20° C. above the crystallite melting point of the polymer, under pressure, and the pressure is subsequently released with expansion.

For the purposes of the present invention, polyolefins are crystalline olefin polymers whose X-ray crystallinity at 25° C. is greater than 25%. Suitable polyolefins for the process are low-, medium- and high-density polyethylenes, for example having a density of from 0.916 to 0.965 g/cm$^3$, preferably from 0.920 to 0.935 g/cm$^3$, as prepared by the high-, low- and medium-pressure processes, polypropylene and ethylene and propylene copolymers containing at least 50 mol% of ethylene and/or propylene units. Examples of suitable comonomers are $\alpha$-alkenes having up to 12 carbon atoms, such as propylene, butene, pentene, hexane and octene, furthermore vinyl esters, such as vinyl acetate, and esters of acrylic acid, methacrylic acid, maleic acid or fumaric acid with alcohols containing 1 to 8 carbon atoms. The polyolefins generally have a melt flow index MFI (230, 2.16, in accordance with DIN 53735) of from 0.5 to 15, preferably from 1 to 12, a melting range of from 100° to 170° C., and a shear viscosity of from $1 \times 10^3$ to $1 \times 10^6$, measured in a rotational viscometer at 150° C. and an angular frequency of from $10^2$ to $10^2$ s$^{-1}$. Mixtures of different polyolefins can also be used.

Preference is given to ethylene-propylene copolymers and copolymers of ethylene, propylene and a $C_4$- to $C_8$-$\alpha$-olefin.

Particularly preferred ethylene-propylene copolymers comprise from 0.5 to 6% by weight of ethylene and from 94 to 99.5% by weight of propylene.

Particularly preferred copolymers of ethylene, propylene and a $C_4$- to $C_8$-$\alpha$-olefin comprise from 0.5 to 6% by weight, preferably from 1 to 6% by weight, in particular from 1.5 to 6% by weight, of ethylene, from 88 to 99% by weight, preferably from 89 to 98% by weight, in particular from 90 to 97% by weight, of propylene and from 0.5 to 6% by weight, preferably from 1 to 6% by weight, in particular from 1 to 5% by weight, of a $C_4$- to $C_8$-$\alpha$-olefin, such as 1-butene, 1-pentene, 1-hexene, 1-heptene or 1-octene. The copolymers should have a torsion modulus of from 100 to 800 N/mm$^2$, preferably from 100 to 700 N/mm$^2$, in particular from 150 to 600 N/MM$^2$.

The copolymers are prepared in a known manner by copolymerization of the monomers by means of transition-metal catalysts. The copolymers have a predominantly random structure, are generally linear and are generally uncrosslinked. The crystallite melting point, determined by the DSC method, is generally from 110° to 155° C., in particular from 115° to 150° C. The heat of melting, determined by the DSC method, is generally from 30 to 110 J/g, preferably from 35 to 100 J/g. Preference is given to copolymers having a melt flow index MFI (230, 2.16, in accordance with DIN 53735) of from 0.5 to 15 g/10 min, in particular from 1 to 12 g/10 min.

The essential feature of the invention is that the polyolefin foams contain, as organic foaming aid, a resin acid, such as abietic acid, hydroabietic acid or isomers thereof, a lower alkyl eater of a resin acid, for example the methyl, ethyl, propyl, isopropyl or n-, i- or tert-butyl ester, abiethyl phthalate or hydroabietyl phthalate. It is also possible to use mixtures of these substances. This organic foaming aid is generally used in an amount of from 0.003 to 0.3% by weight, preferably from 0.01 to 0.1% by weight, based on the polyolefin. Also suitable are technical-grade resin acids, such as (hydro) abietic acid mixtures, and natural products, such as colophony, which essentially comprise these substances.

The foam may furthermore contain conventional additives in effective amounts, such as dyes, pigments, nucleating agents, stabilizers, flameproofing agents, synergists, fillers, plasticizers, lubricants and antistatics.

The additional use of nucleating agents allows the cell size to be regulated. Suitable nucleating agents are known from the prior art and are, for example, talc, calcium carbonate, calcium sulfate, diatomaceous earth, magnesium carbonate, magnesium hydroxide, magnesium sulfate, clay and barium sulfate.

The nucleating agent is generally used in an amount of from 0.05 to 5% by weight, preferably from 0.5 to 2% by weight, based on the polyolefin.

The foams according to the invention have a density of from 0.01 to 0.1 g/cm$^3$, preferably from 0.01 to 0.08 g/cm$^3$, in particular from 0.02 to 0.08 g/cm$^3$. They have a predominantly closed-cell structure with from 2 to 1000, preferably from 5 to 800, in particular from 10 to 500, cells/mm$^2$.

The foams according to the invention are prepared by mixing the polyolefin with the organic foaming aid, with a volatile blowing agent and any additive used and subsequently foaming the mixture. For example, the components are mixed in an extruder, and the mixture is subsequently extruded through a die and granulated.

Suitable blowing agents are low-boiling halogenated hydrocarbons and preferably aliphatic hydrocarbons having 3 to 5 carbon atoms, such as propane, n-butane, isobutane, n-pentane, isopentane and/or neopentane. It is also possible to use mixtures of said blowing agents.

The foams according to the invention are preferably prepared in a manner known per se by the suspension impregnation process, in which the polyolefin, in the form of particles having a mean diameter of from 0.5 to 5 mm, preferably from 0.6 to 4 mm, is expediently coated in aqueous suspension with the foaming aid and impregnated with 0.1 to 0.4 kg, preferably from 0.15 to 0.3 kg, per kg of the polyolefin, of a blowing agent, particularly preferably at from about 5° to 20° C. below the crystallite melting point (DSC maximum) of the polymer, under pressure, and the pressure is subsequently released with expansion.

As foaming aid, a resin acid, a lower alkyl ester of a resin acid or (hydro)abietyl phthalate is added to the suspension medium in an amount of from 0.003 to 0.3% by weight, preferably from 0.01 to 0.25% by weight, particularly preferably from 0.02 to 0.2% by weight, based on the polyolefin.

It has proven particularly advantageous in both procedures according to the invention to dissolve the abietic acid in a relatively high-boiling hydrocarbon or alcohol in a weight ratio of from 1:4 to 4:1, preferably from 1:2 to 2:1, particularly preferably from 1.1:1 to 1:1.1, before metering in. An example of an alcohol which is suitable for this purpose is isopropanol.

The foam particles obtained generally have a mean diameter of from 1 to 20 mm and a bulk density of from about 7 to 55 g/l, preferably from 10 to 50 g/l.

In particular in the case of low bulk densities, the blowing agent frequently diffuses out of the cells more rapidly than ambient air diffuses into the cells. The particles can therefore in some cases shrink to as little as 40% of their original volume. They readopt their original shape if they are treated for a sufficient time, generally 5 to 500 minutes, with air or nitrogen at an excess pressure of from 0.5 to 10 bar at room temperature or at an elevated temperature up to 20° C. below the crystallite melting point of the copolymer. The foam particles can be welded by known methods by heating in porous molds or molds which do not close in a gas-tight manner to give moldings of any desired shape.

The addition of abietic acid or derivatives thereof allows a homogeneous, uniform cell structure to be produced. The moldings used from the foam beads have a uniform, smooth surface. Cut surfaces of these foams have a uniform cell structure.

EXAMPLES

In the Examples, parts are by weight.

The polyolefin foams indicated in the examples comprise 97.5% by weight of olefin copolymers of the composition indicated in the Table, 1.7% by weight of carbon black, 0.3% by weight of aluminum distearate and/or calcium stearate, and 0.5% by weight of conventional oxidation stabilizers for polypropylene, for example thioester and/or sterically hindered phenol derivatives.

The crystallite melting point was determined by heating a 10 mg sample to 200° C. at a rate of 20° C./min, cooling the sample to room temperature at a rate of 20° C./min, and re-heating the sample to above the melting point at a rate of 20° C./min. The crystallite melting point corresponds to the temperature peak in the DSC diagram in the second heating period.

The homogeneity of the foam surface was assessed visually (1 = excellent, 2 = good, 3 = satisfactory, 4 = poor). The cell diameter distribution was determined by evaluating cut surfaces.

The results are shown in the Table.

EXAMPLE 1

100 parts of an ethylene-propylene copolymer (ethylene content 2.4% by weight, melt flow index MFI (230, 2.16) = 10 g/10 min; DSC maximum 148° C., mean particle weight about 1 mg), 23 parts of n/i-butane (60:40), 0.005 part of abietic acid, 230 parts of water, 5 parts of tricalcium phosphate and 0.18 part of sodium dodecylbenzenesulfonate as dispersion aid were heated to 130° C. over the course of 45 minutes with stirring in a pressure vessel and subsequently, while the pressure in the reactor was kept constant at 30 bar by re-injection of nitrogen, discharged through a base valve and decompressed. Foam particles having a bulk density of 15 g/l and containing from 10 to 250 cells/mm$^2$ were obtained.

After drying, the particles were treated with an overpressure of 3 bar of nitrogen at 75° C. for 8 hours and then decompressed. During subsequent storage at room temperature, complete release of pressure had taken place in the cells after about 1.5 hours. The bulk density was then 17 g/l.

The particles were then transferred pneumatically into a preheated mold chamber, a back-pressure of 1 bar being maintained in the mold while it was filled. The mold was heated on both sides with steam at 130° C. for 12 seconds. Pressure was then released, the mold was cooled with water and opened, and the molding was removed. The density of the molding was 30 g/l. The molding exhibited excellent bonding and had a very homogeneous surface.

EXAMPLES 2 TO 4

The procedure was similar to that of Example 1, but the amounts of abietic acid indicated in the Tables (0.01, 0.02 and 0.03% by weight) and various amounts of blowing agents and dispersion aids and different impregnation temperatures and impregnation times were used.

EXAMPLES 5 AND 6

(Comparative Example)

The procedure was similar to that of Example 1, but no abietic acid was used.

EXAMPLES 7 TO 9

The olefin polymer used was a $C_2$-$C_3$-$C_4$-terpolymer having the composition indicated in the Table. Apart from the conditions indicated in the Table, the procedure was similar to that in Example 1, with 0.04, 0.08 and 0.10% by weight of abietic acid being used.

EXAMPLE 10

(Comparative Example)

The procedure was as in Example 7, but no abietic acid was used.

TABLE

| Example | Comonomer content [% by weight] C2 | C3 | C4/C6/C8 | DSC maximum [°C.] | MFI (230, 2.16) [g/10 min] | n/i-butane (60:40) [parts] | Tricalcium phosphate [parts] | Sodium dodecyl-benzene-sulfonate [parts] | Abietic acid [% by wt.] |
|---|---|---|---|---|---|---|---|---|---|
| 1 | 2.4 | 95.1 | — | 148 | 10 | 23 | 5 | 0.18 | 0.005 |
| 2 | 2.4 | 95.1 | — | 148 | 10 | 23 | 5 | 0.18 | 0.01 |
| 3 | 2.4 | 95.1 | — | 148 | 10 | 23 | 5 | 0.18 | 0.02 |
| 4 | 2.4 | 95.1 | — | 148 | 10 | 23 | 5 | 0.18 | 0.03 |
| 5 (comp.) | 2.4 | 95.1 | — | 148 | 10 | 23 | 5 | 0.18 | 0 |
| 6 (comp.) | 2.4 | 95.1 | — | 148 | 10 | 19.7 | 2.5 | 0.18 | 0 |
| 7 | 4 | 91.5 | 2 | 132 | 6.5 | 30 | 5 | 0.18 | 0.04 |
| 8 | 4 | 91.5 | 2 | 132 | 6.5 | 30 | 5 | 0.18 | 0.08 |
| 9 | 4 | 91.5 | 2 | 132 | 6.5 | 30 | 5 | 0.18 | 0.10 |
| 10 (comp.) | 4 | 91.5 | 2 | 132 | 6.5 | 30 | 5 | 0.18 | 0 |

| Example | Impregnation temperature [°C.] | Impregnation time [min] | Bulk density [g/l] | Molding density [g/l] | Mean cell diameter [mm] | Cell diameter distribution [mm] | Homogeneity of the foam surface |
|---|---|---|---|---|---|---|---|
| 1 | 130 | 45 | 17 | 30 | 0.1 | <0.1 to 0.2 | 3 |
| 2 | 130 | 45 | 17 | 30 | <0.1 | <0.1 | 2 |
| 3 | 130 | 45 | 17 | 30 | <0.1 | <0.1 | 2 |
| 4 | 130 | 45 | 17 | 30 | <0.1 | <0.1 | 2 |
| 5 (comp.) | 130 | 45 | 17 | 30 | 0.5 | <0.10.1 to 0.5 | 4 |
| 6 (comp.) | 130 | 45 | 28 | 59 | 0.2 | <0.1 to 0.4 | 4 |
| 7 | 116 | 40 | 17 | 30 | 0.3 | 0.1 to 0.4 | 3 |
| 8 | 116 | 40 | 17 | 30 | 0.27 | 0.2 to 0.4 | 2 |
| 9 | 116 | 40 | 17 | 30 | 0.38 | 0.2 to 0.4 | 2 |
| 10 (comp.) | 116 | 40 | 17 | 30 | 0.5 | <0.1 to 1.0 | 4 |

We claim:

1. A polyolefin foam having a density of from 0.01 to 0.1 g/cm$^3$ and having from 2 to 1000 cells/mm$^2$ and containing an organic foaming aid, wherein the organic foaming aid is a resin acid, lower alkyl ester of a resin acid or (hydro) abietyl phthalate.

2. A polyolefin foam as claimed in claim 1, wherein the foaming aid is employed in an amount of from 0.003 to 0.3% by weight, based on the polyolefin.

3. A polyolefin foam as claimed in claim 1, wherein the foaming aid is abietic acid.

4. A polyolefin foam as claimed in claim 1, wherein the polyolefin is an olefin copolymer comprising from 0.5 to 6% by weight of ethylene, from 88 to 99% by weight of propylene and from 0.5 to 6% by weight of a $C_4$- to $C_8$-α-olefin.

5. A polyolefin foam as claimed in claim 1, wherein the polyolefin is an ethylene-propylene copolymer comprising from 0.5 to 6% by weight of ethylene and from 94 to 99.5% by weight of propylene.

* * * * *